Patented Mar. 14, 1939

2,150,506

UNITED STATES PATENT OFFICE 2,150,506

SYNTHETIC RESIN AND PROCESS OF PREPARING SAME

John H. Kelly, Jr., Chicago, Ill.

No Drawing. Application December 23, 1935,
Serial No. 55,933

13 Claims. (Cl. 260—104)

The invention relates to synthetic resins suitable for incorporation into lacquer films and the process of preparing the same. More particularly it relates to the preparation of a fused rubber-metallic rosinate.

In the subsequent description and claims I have used the word "rubber" in its generic sense to include within its scope crude raw rubber, suitably compounded unvulcanized rubber which may include pigments, coloring matter, sulphur and an accelerator, waste vulcanized rubber, reclaimed rubber, hard rubber dust and other equivalent rubber compounds.

When rubber is fluxed and fused with rosin, the product is usually tacky and sticky and mitigates against usage in paint and lacquer compositions. I am aware that various expedients have been previously proposed to overcome these conditions, such as the incorporation of drying oils and the like, but these expedients often result in products susceptible to premature oxidation. In some instances it has been proposed to predigest the rubber under pressure in alkaline solutions, particularly when waste or hard rubber dust has been the basic material involved, but in my process such treatment is unnecessary. Again, it has been previously considered necessary to lower the viscosity of dissolved rubber by oxidizing the solution with air currents or by the use of oxidation catalysts or driers and also by chemical reagents in order to prepare suitable applications of rubber to incorporate into cellulose lacquers.

In my process I produce resins possessing the essential necessary characteristics, such as low viscosity in solution, durability and excellent hardness by a different process. According to my invention, I first dissolve a small quantity of rubber in molten rosin, adding the remaining rubber in successive small quantities until it has been completely assimilated and dissolved. The temperature is preferably maintained between 430° F. and 460° F. The rubber content of the liquid mixture largely predominates, and may be as high as 80% to 85% of the total solids present in the mixture. The process is carried out in ordinary kettles equipped with agitator blades for stirring the mass and provided with a hood connected to a high speed exhaust blower for carrying off such fumes as may arise. Heat is preferably gas, regulated by Bunsen type burners, thus enabling temperature control to be kept within certain workable limits.

After the first stage of my process is completed the hot liquid rubber rosin mix is now subjected to the action of a basic metallic oxide, changing the rosin of the rubber-rosin compound to a metallic rosinate. This considerably neutralizes the acid value of the rosin and according to the character of the metallic oxide selected produces rosinates of different physical properties. In certain fused rubber-metallic rosinate compounds, zinc, calcium and aluminum rosinates develop very hard, firm, fused rubber-rosinate compounds resistant to moisture and water. Magnesium rosinates react similarly but produce, when dissolved, solutions of higher viscosity, though the solutes of all rubber-rosinates are very low. While most of the basic metallic oxides can be employed with more or less success, some of them are not as fully suitable. Thus litharge rosinates, as also cupric rosinates, produce completely degraded, extremely sticky films, probably due to the depolymerization by heat and decomposition by the oxide. All the fused rubber-metallic rosinate compounds, after dissolving in suitable solvents, give films which remain slightly tacky for several hours, but this condition gradually disappears upon atmospheric exposure. The fused rubber-rosinates possess excellent durability when subjected to weathering tests and do not prematurely oxidize, fissure or crack.

To further improve the properties of the fused rubber-rosinates, I subject them to an esterifying action with a suitable esterifying agent such as glycerol. After the treatment with a selected metallic oxide, the addition of glycerol is made slowly and steadily while agitating the mass and maintaining the temperature at 460° F. to 490° F. for 30 minutes, more or less, until the reaction is completed which is evidenced by the change in the appearance of the fumes arising from the kettle. Esterification of the rosinate at this temperature considerably reduces hygroscopic characteristics possessed by the rosinates in general. The resultant product, when cooled, is a hard vitreous fused rubber-esterified rosin mixture which when dissolved in suitable solvents produces films having brilliant lustre and extremely durable aging qualities.

At the temperatures maintained during this reaction, esterification of the rosin is probably incompleted and a small proportion of unchanged free glycerol is probably distributed in the fused mixture. Such proportion of free glycerol is considered beneficial and exerts a marked preservation action against oxidation while the rubber content is sufficiently high to offset the moisture-attractive propensities of glycerol.

In a modified process, I react the glycerol with the rubber-rosinate mixture at higher temperatures ranging between 555° F. and 560° F. This results in complete esterification of the rosinate and the reaction peak is completed within 45 minutes. The acid number of the resin is very low, below 5 in most instances, and the resultant product, when dissolved in low boiling solvents (60° F. to 120° F.), can be clarified by decanting the solution or else by the usual methods available to the arts. After the solution is purified I next distill off the solvents and dry the residual resin. The resulting products are extremely hard, clear vitreous resins, possessing low solution viscosities and excellent adaptability to cellulose lacquer coatings, etc.

What I claim as my invention is:

1. In the process of producing a fused rubber-rosinate compound suitable for lacquer coatings, the step of treating a fused rubber-rosinate compound at a temperature not substantially less than 460° F. with glycerol.

2. In the process of producing a fused rubber-rosinate compound suitable for lacquer coatings, the step of treating a fused rubber-rosinate compound with glycerol at a temperature between 430° F. and 490° F.

3. In the process of producing a fused rubber-rosinate compound suitable for lacquer coatings, the step of treating a fused rubber-rosinate compound with glycerol at a temperature between 555° F. and 560° F.

4. A resin suitable for lacquer coatings comprising an esterified fused rubber-metallic rosinate in which the rubber content predominates, said resin having low acid value and when dissolved in solvents forms durable films resistant to premature oxidation and cracking.

5. A hard, clear vitreous resin comprising a glycerol-esterified fused rubber-metallic rosinate compound in which the rubber content predominates.

6. The process of producing a synthetic resin comprising fusing a preponderance of rubber with rosin at a temperature not substantially less than 430° F., reacting said fusion mixture with a basic metallic oxide forming a fused rubber-metallic rosinate, treating said rosinate with glycerol at a temperature not substantially less than 460° F. until the reaction evidenced by the change in appearance of the fumes is completed and cooling to obtain a hard, vitreous material having low acid number and reduced hygroscopic characteristics which when dissolved in suitable solvents produces films having brilliant lustre and extremely durable aging qualities.

7. The process of producing a synthetic resin comprising fusing a preponderance of rubber with rosin at a temperature not substantially less than 430° F., reacting said fusion mixture with a basic metallic oxide forming a fused rubber-metallic rosinate, treating said rosinate with glycerol at a temperature not substantially less than 555° F., cooling to obtain a hard vitreous material, dissolving in low boiling solvents, removing the clear solution from undissolved residue, distilling the solvents and drying the residue from said distillation.

8. The process for the manufacture of a synthetic resin suitable for incorporation into lacquer films which comprises dissolving rubber in molten rosin to obtain a mixture in which the total solids contain a predominating amount of rubber, reacting the hot liquid mixture with calcium oxide capable of converting the rosin in said mixture into calcium rosinate, adding glycerol, and maintaining an elevated temperature until the rosinate is esterified, thereby producing a product having hygroscopic characteristics less than rosinates in general, said product when cooled and dissolved in solvents being a lacquer capable of producing films having lustre.

9. The process for the manufacture of a synthetic resin sutable for incorporaton into lacquer films which comprises dissolving rubber in molten rosin to obtain a mixture in which the total solids contain a predominating amount of rubber, reacting the hot liquid mixture with calcium oxide capable of converting the rosin in said mixture into calcium rosinate, adding glycerol, and maintaining a temperature not substantially less than 555° F. until esterification of the rosinate is substantially complete, thereby producing a resin having a low acid number.

10. The process for the manufacture of a synthetic resin suitable for incorporation into lacquer films which comprises dissolving rubber in molten rosin to obtain a mixture in which the total solids contain a predominating amount of rubber, reacting the hot liquid mixture with calcium oxide capable of converting the rosin in said mixture into calcium rosinate, adding glycerol, maintaining a temperature not substantially less than 555° F. until esterification of the rosinate is substantially complete, dissolving said product, separating the clear solution from the residue, and evaporating the solvent, thereby obtaining a hard, clear, vitreous resin possessing low solution viscosity.

11. In the process of producing a fused rubber rosinate compound suitable for lacquer coatings, the step of treating a fused rubber rosinate compound at a temperature not substantially less than 460° F. with glycerol to obtain an esterified product.

12. In the process of producing a synthetic resin suitable for lacquer coatings, the step of treating a fused rubber metallic rosinate compound with glycerol to obtain an esterified product.

13. A synthetic resin suitable for lacquer coatings, comprising a glycerol-esterified fused rubber-metallic rosinate compound in which the rubber content predominates, said compound having an acid number below 5 and being extremely hard, clear, vitreous and possessing low solution viscosity.

JOHN H. KELLY, Jr.